United States Patent [19]

Barabas et al.

[11] 3,899,461

[45] Aug. 12, 1975

[54] COPOLYMERS OF AN N-VINYL LACTAM AND A BRANCHED CHAIN ALIPHATIC CARBOXYLIC ACID ESTER

[75] Inventors: Eugene S. Barabas, Watchung; Marvin M. Fein, Westfield, both of N.J.

[73] Assignee: GAF Corporation, New York, N.Y.

[22] Filed: Jan. 26, 1973

[21] Appl. No.: 327,106

[52] U.S. Cl....... 260/29.6 HN; 260/85.7; 260/23 R; 260/23 EM
[51] Int. Cl............................ C08f 19/00; C09d 5/02
[58] Field of Search.................... 260/85.7, 29.6 HN

[56] References Cited
UNITED STATES PATENTS

| | | | |
|---|---|---|---|
| 2,667,473 | 1/1954 | Morner et al...................... | 260/85.7 |
| 3,479,327 | 11/1969 | Grosser et al...................... | 260/85.7 |
| 3,691,125 | 9/1972 | Barabas............................ | 260/85.7 |

*Primary Examiner*—Howard E. Schain
*Assistant Examiner*—Peter F. Kulkosky
*Attorney, Agent, or Firm*—Walter C. Kehm; James N. Blauvelt

[57] ABSTRACT

There is disclosed a copolymer composition derived from monomeric units comprising (a) an N-vinyl lactam corresponding to the formula:

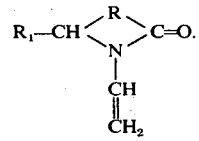

wherein R represents a divalent alkylene bridge having sufficient carbon atoms to form a five, six or seven member heterocyclic ring system and $R_1$ is a member selected from the group consisting of hydrogen and lower alkyl and (b) a branched chain aliphatic carboxylic acid ester corresponding to the formula:

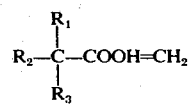

wherein $R_1$, $R_2$ and $R_3$ are saturated alkyl groups. The polymers of the invention may be made into homogeneous solutions when the amount of (a) is 1:99% and the amount of (b) is 99:1% of the total weight of the polymer or suspensions; or they may be made as stable aqueous emulsions when the ratio of (a) and (b) is 10:60% and 90:40%, respectively.

12 Claims, No Drawings

COPOLYMERS OF AN N-VINYL LACTAM AND A BRANCHED CHAIN ALIPHATIC CARBOXYLIC ACID ESTER

BACKGROUND OF THE INVENTION

This invention relates to copolymer compositions and more particularly to copolymer compositions of N-vinyl lactams and branched chain aliphatic carboxylic acid esters.

Copolymer compositions comprising N-vinyl lactams copolymerized with specific monomers are well known in the art and find application in a great many areas of use. By reason of the inherent characteristics of the N-vinyl lactams, these polymers are in general water soluble and thus are eminently suitable in such varied industrial applications as pharmaceuticals, cosmetics, textiles and lithographic uses. However, the inherent water solubility of these prior compositions has virtually precluded their use in applications in a homogeous system which is suitable for resistance to hydrolysis, i.e., where a hard and substantially tackless resin is needed, without any appreciable loss in pliability. Suitable uses are in the paint and coating arts, such as in an oil-base paint or as an adjunct to a coating formula.

SUMMARY OF THE INVENTION

It is an object of this invention to provide for a copolymer system which is resistant to hydrolysis.

It is another object of this invention to provide for such compositions comprised of a copolymer of an N-vinyl lactam and an ester of a branched chain aliphatic carboxylic acid which may be prepared in the form of solution, suspension, or stable aqueous emulsion, respectively.

It is a further object of the invention to provide for the production of copolymers of N-vinyl lactams and esters of branched chain aliphatic carboxylic acids, particularly those having double substitution on the penultimate carbon atom.

Still other objects and advantages of the present invention will become apparent as the description thereof proceeds.

These and other objects and advantages of the invention are attained by the provision of novel copolymer compositions comprising N-vinyl lactams and branched aliphatic carboxylic acid esters. Also, provided by the present invention is a process for producing said copolymers comprising subjecting a mixture of said N-vinyl lactams and said esters to polymerization at elevated temperatures in the presence of a polymerization initiator so as to effect polymerization through the ethylenic double bond.

According to the method of the present invention, as more fully delineated hereinafter, novel copolymers of N-vinyl lactams and branched chain aliphatic carboxylic acid esters are produced under mild conditions of polymerization in good yields and conversions.

The N-vinyl lactams employed as primary reactants in forming the novel copolymers of this invention may be represented by the following general formula:

I 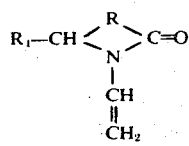

wherein R represents a divalent alkylene radical or bridge group having sufficient carbon atoms to form a five, six or seven membered heterocyclic ring system, and $R_1$ is a member selected from the group consisting of hydrogen, alkyl, aryl, alkaryl, aralkyl, etc., preferably hydrogen or methyl. The preferred reactant falling within the above formula is N-vinyl pyrrolidone, a material well known in the art, as are the other N-vinyl lactams embraced by Formula I. N-vinyl lactams and water soluble polymers thereof, and methods for their production are well known in the art. Thus, for example, U.S. Pat. No. 2,317,804 discloses a suitable method for preparing N-vinyl lactams and U.S. Pat. Nos. 2,215,450 and 2,335,454 disclose methods for preparing water soluble polymers thereof and aqueous solutions containing the same. As examples of N-vinyl lactams which may be employed, there may be mentioned the N-vinyl derivatives of gamma-, delta-, and epsilon-lactams (N-vinyl derivatives of the cyclic amides of gamma-, delta-, and epsilon aminocarboxylic acids of the aliphatic series) and lower alkyl (methyl, ethyl) substituted derivatives of such N-vinyl lactams. Among this group, N-vinyl-2-pyrrolidone (otherwise referred to as l-vinyl-2-pyrrolidone, N-vinyl-alpha-pyrrolidone) is preferred. As illustrative of other N-vinyl lactams within this group there may be mentioned N-vinyl-2-piperidone, N-vinyl-6-caprolactam, N-vinyl-5-methyl-2-pyrrolidone, N-vinyl-3,3-dimethyl-2-pyrrolidone and the like. Other N-vinyl lactams which may be employed include N-vinyl-hexahydrophthalamidine, N-vinyl-naphthostyrile, etc.

The branched chain aliphatic carboxylic acid ester monomers subjected to copolymerization with the above defined N-vinyl lactams may be represented by the following structural formula:

II 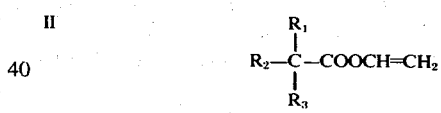

wherein $R_1$, $R_2$ and $R_3$ are saturated alkyl groups. Preferred esters falling within the above formula are the vinyl ester of neopentanoic acid, vinyl ester of 2,2-dimethyl hexanoic acid, and the like.

The copolymers are substantially insoluble in water, aliphatic hydrocarbons and chlorinated solvents but are readily soluble in a number of other organic solvents such as alcohols, esters, ethers, ketones, aldehydes, aromatic hydrocarbons, and heterocyclic compounds.

The copolymers of the present invention can be made cross-linkable by introducing small amounts of a bifunctional monomer to the reaction mixture. These bifunctional compounds have a polymerizable unsaturated group and another group suitable for cross-linking by heat treatment or by the action of added bifunctional compounds. Compounds suitable as termonomers are polymerizable acids, such as acrylic acid, metharylic acid; hydroxyl compounds such as hydroxyethyl methacrylate; ketones, such as methylvinyl ketones; epoxy compounds, such as glycidyl methacrylate, and the like.

Since the copolymeric products of the invention have limited solubility in water they may be employed as emulsions for use as cast films in forming protective coatings, impregnants and sizing agents for paper, leather, and the like.

The novel copolymers of this invention can be readily and conveniently prepared by subjecting a suitable mixture of the desired N-vinyl lactam material and the ester to polymerization conditions, whereby vinyl-type polymerization occurs through the ethylenically unsaturated groups. Various methods for carrying out vinyl-type polymerizations are well known in the art and include the use of various reagents for initiating the polymerization, such as the use of free-radical yielding initiators and the like.

The copolymerization is carried out in the presence of a free-radical catalyst or initiating agent. By "free-radical catalyst" there is meant a catalyst which forms a free radical under the polymerization conditions employed, and includes compounds having an —O—O— or —N=N— linkage. Such catalysts include the per-compounds such as organic and inorganic peroxides, for example: benzoyl peroxide, cumene-hydroperoxide, hydrogen peroxide, ditertiary-butyl peroxide, lauroyl peroxide, t-butyl peroxy pivalate per-sulfates, including sodium and potassium persulfate, ammonium persulfate and the like. Also, perborates such as sodium, potassium, and ammonium perborates can be used as well as azo compounds such as alpha-azo diisobutyronitrile and the like. If desired, mixtures of these initiators can be employed. The catalyst concentration employed in the reaction system is not necessarily a critical feature of the invention and thus can be varied over a wide range. Advantageously, however, an amount of catalyst from about 0.01 to 1.0 weight percent or more can be employed based on the total weight of the reactants being polymerized.

DETAILED DESCRIPTION

Broadly speaking, the invention includes the provision of a copolymer composition derived from monomeric units comprising (a) an N-vinyl lactam corresponding to the formula:

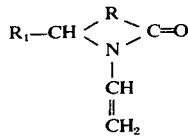

wherein R represents a divalent alkylene bridge having sufficient carbon atoms to form a five, six or seven member heterocyclic ring system and $R_1$ is a member selected from the group consisting of hydrogen and lower alkyl and (b) a branched chain aliphatic caroby-lic acid ester corresponding to the formula:

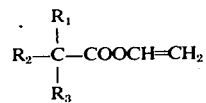

wherein $R_1$, $R_2$ and $R_3$ are saturated alkyl groups, a stable aqueous emulsion containing same and a method for the production thereof.

The polymers of the invention may be made into homogeneous solutions when the amount of (a) is 1:99 percent and the amount of (b) is 99:1 percent of the total weight of the polymer or suspensions; or they may be made as stable aqueous emulsions when the ratio of (a) and (b) is 10:60 percent and 90:40 percent, respectively.

The polymerization can be carried out in the presence of an organic solvent (such as alcohols, ketones, aromatic hydrocarbons, chlorinated solvents, etc.), which enable uniform temperature control throughout the reaction mixture although the use of a diluent is not essential.

These organic solvents may be such that dissolve also the polymer, in which case the copolymers of the invention are obtained as uniform solutions. However, the polymerization may also be carried out in solvents in which the polymer is insoluble. In the latter case, the polymer separates from the medium during the polymerization, and is obtained as a solid.

Conversely, the reaction may be carried out in water to form stable emulsions, or in salt solutions to give bead polymers.

For the preparation of the copolymers of this invention, it is preferred that the ester be introduced into the reaction system along with the N-vinyl lactam (such as N-vinyl pyrrolidone or the like) and that the reaction be carried out by dissolving or dispersing the reactants in the selected reaction medium of a desired concentration and in the presence of the initiating agent for the polymerization.

The ratios of each of the above primary reactants employed in the process may be varied over a wide range in order to obtain copolymer products of varied properties. Thus the N-vinyl lactam and ester may be employed in ratios of from about 1 to 99 percent by weight of the N-vinyl lactam with correspondingly from about 99 to about 1 percent by weight of the ester, when the polymerization is carried out in an organic solvent.

The N-vinyl lactam and ester may be employed in ratios of from about 10 to 60 percent by weight of the N-vinyl lactam with correspondingly from about 90 to 40 percent by weight of the ester, when the polymers are prepared in water either as stable emulsions or as suspensions. Hence, the ratio of each of the reactants is not necessarily critical to the attainment of the objects of the invention.

Temperatures at which the reaction may advantageously be carried out can be varied over a range of about 30°C or lower to about 150°c or higher depending on the reactants. However, it is preferred to conduct the polymerization reaction at about 60°C to 90°C to avoid unduly violent reactions. The reaction is normally carried out in a reaction vessel under a blanket of an inert gas such as nitrogen, argon and the like; and preferably conducted at atmospheric pressure. Additionally, it has been found necessary that the polymerization be conducted in the essential absence of free oxygen in order to provide optimum conditions for the polymerization reaction to occur.

If desired, an activating agent such as an alkali metal sulfite or bisulfite — for example, sodium meta bisulfite, etc. — can be added to the polymerization mixture in about the same amount as the polymerization catalyst, in which case lower polymerization temperatures can be employed. Additionally, chain regulators such as hexyl, cetyl, dodecyl, myristyl, etc., mercaptans may be employed in the reactions.

Furthermore, when the polymerization is carried out in water, suitable surface active agents may be added to the mixture in order to facilitate solubilization of the ester and formation of an emulsion. These surface active agents include fatty acid soaps, fatty alcohol sulfates such as sodium lauryl sulfate, potassium lauryl sulfate, etc., alkali metal salts of aromatic sulfonic acids — for example — sodium isobutylnaphthalene sulfonate, phosphate esters of polyethoxy alkyl phenols, sulfosuccinic esters, etc.

The following examples will serve to illustrate the invention. They are not, however, to be considered as limiting. All parts and proportions herein as well as in the appended claims are by weight unless otherwise specified.

EXAMPLE I

Apparatus: A 1 liter resin kettle equipped with a mechanical stirrer, reflux condenser, graduated dropping funnel, thermometer and gas inlet tube.

Procedure: 450 g ethanol (SD-40 anh.) and 0.5 g azobis-isobutyronitrile are charged into the resin kettle. The system is purged thoroughly with nitrogen and the temperature raised to 80°C. At this point a mixture of 100 g vinyl ester of 2,2-dimethyl enanthic acid and 100 g N-vinyl-2-pyrrolidone is added. The reaction mixture is kept at gentle reflux for 2 hours. After adding 0.25 g azo-bis-isobutyronitrile, 20 g N-vinyl-2-pyrrolidone is introduced over a 30 minute period. The mixture is then allowed to react for 30 more minutes after which time the addition of catalyst and comonomers is repeated. Finally, the resulting viscous polymer solution is cooled to room temperature and filtered through a 200 mesh screen.

EXAMPLE II

Apparatus: As described in Example I.

Procedure: A solution of 0.5 g of azo-bis-isobutyronitrile in 450 g ethanol (SD-40 anh) is heated to 80°C in nitrogen atmosphere. A mixture of 50 g vinyl ester of 2,2 dimethyl enanthic acid and 70 g N-vinyl-2-pyrrolidone is added over 1 hour, and the mixture allowed to react for an additional 2 hours. A solution of 0.25 g catalyst in 10 g ethanol is added, thereafter 40 g N-vinyl-2-pyrrolidone is added in one batch. After keeping the system at gentle reflux for 1 hour, 0.25 g catalyst is added followed by the addition of 40 g N-vinyl-2-pyrrolidone. The reaction is finished in the manner described in Example I.

EXAMPLE III

Apparatus: A 2 liter resin kettle equipped as described in Example I.

Procedure: A mixture of 300 g N-vinyl-2-pyrrolidone, 175 g of the vinyl ester of 2,2-dimethyl enanthic acid and 25 g acrylic acid is placed in a graduated dropping funnel (mixture I). A solution of 1.25 g azo-bis-isobutyronitrile (thereafter: catalyst) in 500 g ethanol (SD-40) is charged to the resin pot and the system purged with nitrogen. About one-third of aforesaid mixture I (168 g) is then added in one batch and the temperature raised to 80°C. The temperature is maintained for 2½ hours, whereafter 125 g of a 1 percent catalyst solution in ethanol is added. About one-third of the monomer mixture (I) (166 g) is thereafter introduced gradually over a ½ hour period and the system maintained at 80° C for another hour. After which time 125 g 1 percent ethanolic catalyst solution is added thereto followed by the addition of the remainder of the monomer mixture I (166 g) over a ½ hour period. The system is kept at 80° C overnight (about 8 hours), then cooled to room temperature and the polymer discharged through a 200 mesh screen.

EXAMPLE IV

Apparatus: As described in Example I.

Procedure: As described in Example I except that vinyl ester of 2,2-dimethyl pelargonic acid is used in place of vinyl 2,2-dimethyl enanthoate.

EXAMPLE V

Apparatus: As described in Example I.

Procedure: A solution of 2.0 g "Gafac" RE-610 and 1.0 g sodium acetate is placed in the resin kettle. To this solution are added 20.0 g of N-vinyl-2-pyrrolidone and 20.0 g 2,2-dimethyl enanthic acid vinylester. The system is purged thoroughly with nitrogen, then 1.0 g ammonium persulfate is introduced. Heating is started, and the mixture is heated to 50° C. At this temperature the addition of a solution is started, which consists of 1.0 g sodium metabisulfite dissolved in 150 g water. The addition of this solution is made in 2¼ hours.

Heating is continued, and the system is heated to 65° C which is maintained through the rest of the reaction. When 65° C is reached, addition is started from a separate dropping funnel, which contains a mixture of 180.0 g N-vinyl-2pyrrolidone, 180.0 g 2.2-dimethyl enanthic acid vinylester and 2.0 g "Gafac" RE-610. The addition of latter mixture is made in 2 hours. When the addition is over, the mixture is kept at 65° C for 2 more hours, then the system is cooled to 25° C. The emulsion is discharged through cheese-cloth.

EXAMPLE VI

Apparatus: As described in Example I.

Procedure: A 1.0 g sample of the copolymer described in Example I is placed in a 250 ml Erlenmeyer-flask, and 50 ml 0.5 N KOH solution is added. The flask is equipped with a condenser. The flask is heated on a steambath for 1 hour, then 2 drops of a phenolphthalein solution is added. The solution is titrated with ½ N HCl until the pink color disappears. With the sample, simultaneously heat a blank containing the same amount of NaOH solution. Saponification number (calculated as $$\frac{B-S \times 56.1 \times N}{2 \times \text{weight of sample}}$$

where B=ml HCl for blank, and S=ml HCl for sample) is zero, indicating no hydrolysis. Together with above sample, treat with KOH solution a preparation made by polymerizing 100.0 g N-vinyl-2-pyrrolidone and 100.0 g vinylacetate in 450 ml ethanol SD-40 anh.

The saponification number is 69.5, indicating 97.8 percent saponification of the ester.

In a similar manner, other N-vinyl lactams and esters of the classes described hereinabove can be employed as described in these examples with similar results.

It is obvious that numerous changes and modifications can be made in the above-described specific embodiments without departing from the spirit and nature of the invention. Therefore, it is to be understood that all such changes and modifications are included within the scope of the invention and the invention is not to

We claim:

1. A copolymer composition, comprising approximately, by weight, (a) 1:99 percent of an N-vinyl lactam selected from the group consisting of N-vinyl-2-pyrrolidone, N-vinyl-2-piperidone, N-vinyl-6-caprolactam, N-vinyl-5-methyl-2-pyrrolidone, N-vinyl-3,3-dimethyl-2-pyrrolidone, N-vinyl-hexahydrophthalamidine, and N-vinyl-anphthostyrile; and (b) 99:1 percent of a branched chain aliphatic carboxylic acid ester corresponding to the formula:

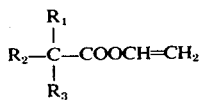

wherein $R_1$, $R_2$, and $R_3$ are saturated alkyl groups.

2. A copolymer as defined in claim 1 wherein said branched chain aliphatic carboxylic acid ester is selected from the group consisting of vinyl esters of 2,2-dimethylpropanoic acid, 2,2-dimethylhexanoic acid, and 2,2-dimethylpelargonic acid.

3. A copolymer as definded in claim 2 wherein said N-vinyl lactam is N-vinyl-2-pyrrolidone and said ester is the vinyl ester of 2,2-dimethylpropanoic acid.

4. A copolymer as defined in claim 1 containing 10 to 60% of component (a) and 40 to 90% of component (b).

5. A copolymer as defined in claim 1 wherein said N-vinyl lactam is N-vinyl pyrrolidone.

6. A stable aqueous emulsion containing the copolymer as defined in claim 1.

7. A process for producing a copolymer as defined in claim 1, comprising polymerizing components (a) and (b) in a reaction medium containing a free radical supplying polyermization catalyst.

8. A process as defined in claim 7, wherein said reaction medium is an organic solvent.

9. A process as defined in claim 7 wherein said polymerization is carried out at temperatures of about 30° to 150° C.

10. A process for producing a stable aqueous emulsion as defined in claim 6, comprising subjecting components (a) and (b) in aqueous reaction medium to polymerization conditions in the presence of a water soluble emulsifying agent and a free radical supplying polymerization catalyst.

11. A process as defined in claim 9 wherein said aqueous reaction medium is water.

12. A process for producing a copolymer as defined in claim 1 comprising carrying out the procedure as defined in claim 10 followed by the additional step of separating from the resulting emulsion the copolymer contained therein.

* * * * *